(12) United States Patent
Jia et al.

(10) Patent No.: US 8,510,096 B2
(45) Date of Patent: Aug. 13, 2013

(54) METHOD AND DEVICE FOR SELECTING INTERFACE LANGUAGE OF SOFTWARE

(75) Inventors: Yanhong Jia, Shenzhen (CN); Xiaolei Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/496,066

(22) PCT Filed: May 21, 2010

(86) PCT No.: PCT/CN2010/073056
§ 371 (c)(1),
(2), (4) Date: Mar. 14, 2012

(87) PCT Pub. No.: WO2010/148858
PCT Pub. Date: Dec. 29, 2010

(65) Prior Publication Data
US 2012/0271621 A1    Oct. 25, 2012

(30) Foreign Application Priority Data

Dec. 22, 2009    (CN) .......................... 2009 1 0254387

(51) Int. Cl.
*G06F 17/20* (2006.01)
(52) U.S. Cl.
USPC ............................................................ 704/8
(58) Field of Classification Search
USPC ............................................................. 704/8
See application file for complete search history.

(56) References Cited

U.S. PATENT DOCUMENTS

| 5,794,052 A | * | 8/1998 | Harding | 717/178 |
| 6,334,101 B1 | * | 12/2001 | Hetherington et al. | 704/8 |
| 6,396,515 B1 | | 5/2002 | Hetherington et al. | |
| 7,318,087 B2 | * | 1/2008 | Hauduc et al. | 709/217 |
| 7,412,374 B1 | * | 8/2008 | Seiler et al. | 704/8 |
| 7,925,497 B2 | * | 4/2011 | Takahashi | 704/8 |

(Continued)

FOREIGN PATENT DOCUMENTS

| CN | 1577263 A | 2/2005 |
| CN | 1758218 A | 4/2006 |
| CN | 100345108 C | 10/2007 |
| CN | 101089852 A | 12/2007 |

OTHER PUBLICATIONS

International Search Report for PCT/CN2010/073056 dated Aug. 25, 2010.

*Primary Examiner* — Douglas Godbold
(74) *Attorney, Agent, or Firm* — Stephen Yang; Ling Wu; Ling and Yang Intellectual property

(57) ABSTRACT

The present invention discloses a method and apparatus for selecting an interface language of software, wherein, the method includes: the software is started and judged whether it is the first start; if it is, the interface language currently used by an operation system is obtained to match a plurality of languages preset by the software, if the match is successful, the interface language used currently by the operation system is selected as the interface language of the software, and if the match is unsuccessful, the default interface language of the software is selected as the interface language of the software; if it is not the first start, the pre-configured interface language recorded by the software is used as the interface language of the software. The above method for adaptively selecting an interface language provided by the present invention facilitates use of users.

14 Claims, 4 Drawing Sheets

(56) References Cited

U.S. PATENT DOCUMENTS

| | | | |
|---|---|---|---|
| 2002/0144105 A1* | 10/2002 | Real | 713/2 |
| 2003/0046527 A1* | 3/2003 | Musuchenborn | 713/1 |
| 2003/0097554 A1 | 5/2003 | Cheston et al. | |
| 2003/0191817 A1* | 10/2003 | Fidler | 709/219 |
| 2004/0210841 A1* | 10/2004 | Takahashi | 715/536 |
| 2005/0192794 A1* | 9/2005 | Ertemalp et al. | 704/8 |
| 2006/0210026 A1* | 9/2006 | Duplessis et al. | 379/88.05 |
| 2007/0245346 A1* | 10/2007 | Shintoku | 717/174 |
| 2009/0083025 A1* | 3/2009 | Hauduc et al. | 704/8 |
| 2011/0113425 A1* | 5/2011 | Tuttle et al. | 717/178 |
| 2011/0126098 A1* | 5/2011 | Jellison Jr. | 715/703 |
| 2011/0137637 A1* | 6/2011 | Takahashi | 704/8 |

* cited by examiner

METHOD AND DEVICE FOR SELECTING INTERFACE LANGUAGE OF SOFTWARE

TECHNICAL FIELD

The present invention relates to the field of the interface language of application software, and in particularly to a method and an apparatus for selecting an interface language of software.

BACKGROUND OF THE RELATED ART

A rapid development of global information technology places higher demands on the software development field; especially with the popularization of the present 3G mobile communication technology and even the coming of 4G, operators in various regions have to develop beyond the old software continuously to attract different user groups in order to have an invincible position in furious marketing competitions.

The users whom internationalized application software needs to face should be a user group using different languages, and how to provide a multi-language environment more conveniently and quickly is the problem the software has to solve. The present method for selecting multiple languages used for the interface language of the software only allows a user to select the interface language such as English or Chinese according to the natural language he/she gets used to during the installation of the software; moreover, once the user selects an interface language during the installation, the interface language is very difficult to change unless the software is re-installed, and although some software sets a language switching option for users, the switching can be valid only when the application software is re-started. the above way of selecting the interface language of the application software is inconvenient to use and thus influences the usage experience of users.

SUMMARY OF THE INVENTION

The embodiment of the present invention provides a method and an apparatus for selecting an interface display language of software to solve the problem that the present way of selecting the interface display language of the application software is inconvenient to use and thus influences the usage experience of users.

A method for selecting an interface language of software provided by an embodiment of the present invention, comprising:

starting software and judging whether the software is started for the first time;

if yes, obtaining an interface language used currently by an operation system to match multiple languages pre-configured by the software, if the match is successful, selecting the interface language used currently by the operation system as the interface language of the software, if the match is unsuccessful, selecting a default interface language of the software as the interface language of the software;

if not, using a pre-configured interface language recorded by the software as the interface language of the software.

In the step of judging whether the software is started for the first time, it is judged by judging whether a configuration option is used in a configuration file of the software for the first time.

After the step of selecting the interface language used currently by the operation system as the interface language of the software or the step of selecting the default interface language of the software as the interface language of the software, the method may further comprise:

writing the selected interface language into the configuration file as a current language configuration option; wherein, the pre-configured interface language recorded by the software is the interface language recorded by the current language configuration option of the configuration file of the software.

After the step of writing the selected interface language into the configuration file as a current language configuration option, or after the step of using the interface language that has been recorded by the current configuration option of the configuration file of the software as the interface language of the software, the method may further comprise:

reading the interface language recorded by the current language configuration option in the configuration file of the software, loading a language resource file corresponding to the read interface language, and displaying a character string in the loaded language resource file on an interface of the software.

The step of loading the language resource file corresponding to the read interface language and displaying the character string in the loaded language resource file on the interface of the software may comprise:

invoking the language resource file corresponding to the interface language recorded by the current language configuration option;

analyzing each character string corresponding to a description of the software interface and recorded by the language resource file;

displaying the analyzed character string on the interface of the software.

The method may further comprising: when an operation instruction for switching the interface language of the software sent by a user is received, analyzing the interface language needing to be switched to that is instructed by the operation instruction;

updating a record of the current language configuration option in the software configuration file using the analyzed interface language;

loading the language resource file corresponding to the analyzed interface language;

refreshing the interface of the software, and displaying the character string in the loaded language resource file on the interface of the software.

An apparatus for selecting an interface language of software provided by an embodiment of the present invention, comprising:

a starting module, which is configured to start the software and judge whether the software is started for the first time;

an obtaining module, which is configured to: when the starting module judges that the software is started for the first time, obtain an interface language used currently by an operation system;

a matching module, which is configured to match the interface language used currently by the operation system with multiple languages pre-configured by the software;

a selecting module, which is configured to: when the matching module matches successfully, select the interface language used currently by the operation system as the interface language of the software, and if is the match is unsuccessful, select a default interface language as the interface language of the software; and when the starting module judges that the software is not started for the first time, use a pre-configured interface language recorded by the interface display language of the software.

The starting module is configured to judge whether the software is started for the first time by judging whether a configuration option in a configuration file of the software is used for the first time.

The apparatus for selecting an interface language of software provided by an embodiment of the present invention may further comprise: a writing module and a configuration file storing module; the writing module is configured to write the selected interface language into the configuration file of the software as a current language configuration option;

the configuration file storing module is configured to store the configuration file of the software.

The apparatus for selecting an interface language of software provided by the embodiment of the present invention may further comprise: a loading module, which is configured to read the interface language recorded by the current language configuration option in the configuration file of the software, load a language resource file corresponding to the read interface language, and display a character string in the loaded language resource file on an interface of the software.

The loading module may comprise:

an invoking sub-module, which is configured to invoke the language resource file corresponding to the interface language recorded by the current language configuration option;

an analyzing sub-module, which is configured to analyze each character string corresponding to a description of the interface of the software and recorded by the language resource file;

a displaying sub-module, which is configured to display the character string analyzed by the analyzing sub-module on the interface of the software.

The apparatus for selecting an interface language of software provided by the embodiment of the present invention apparatus may further comprise: a switching module, which is configured to receive, when receiving an operation instruction for switching the interface language of the software sent by a user, analyze the interface language needing to be switched to that is instructed by the operation instruction;

the writing module is further configured to update a record of the current language configuration option in the software configuration file using the interface language analyzed by the switching module;

the loading module is further configured to load a language resource file corresponding to the interface language analyzed by the switching module, refresh the interface of the software, and display the character string in the loaded language resource file on the interface of the software.

The beneficial effects of embodiments of the present invention include:

according to the method and apparatus for selecting an interface language of software provided by the embodiments of the present invention, the software is started and judged whether it is started for the first time; if it is, the interface language currently used by an operation system is obtained to match a plurality of languages preset by the software, if the match is successful, the interface language used currently by the operation system is selected as the interface language of the software, if the match is unsuccessful, the default interface language of the software is selected as the interface language of the software. Since the interface language used by the operation system is generally determined by the user according to his own language usage habits or requirements, this adaptive selecting method could avoid the trouble of the user pre-selecting an interface language of the software under the premise of satisfying the usage habits and usage requirements of the user, and facilities utilization of users and improves the experience of users.

According to the method and apparatus for selecting an interface language of software provided by the embodiments of the present invention, when a user needs to switch the interface language of the present software, the interface language needing to be switched to that is instructed by a user switching operation instruction is analyzed; a language resource file corresponding to the analyzed interface language is loaded; the interface of the software is refreshed, and the character string in the loaded language resource file is displayed on the interface of the software. The switching of the interface language may be validated without re-starting the software, so the user switches the interface language more conveniently and quickly.

PREFERRED EMBODIMENTS OF THE PRESENT INVENTION

The method and apparatus for selecting an interface language of software provided by the present invention will be described in detail below with reference to specific embodiments in combination with drawings.

Figure 1:
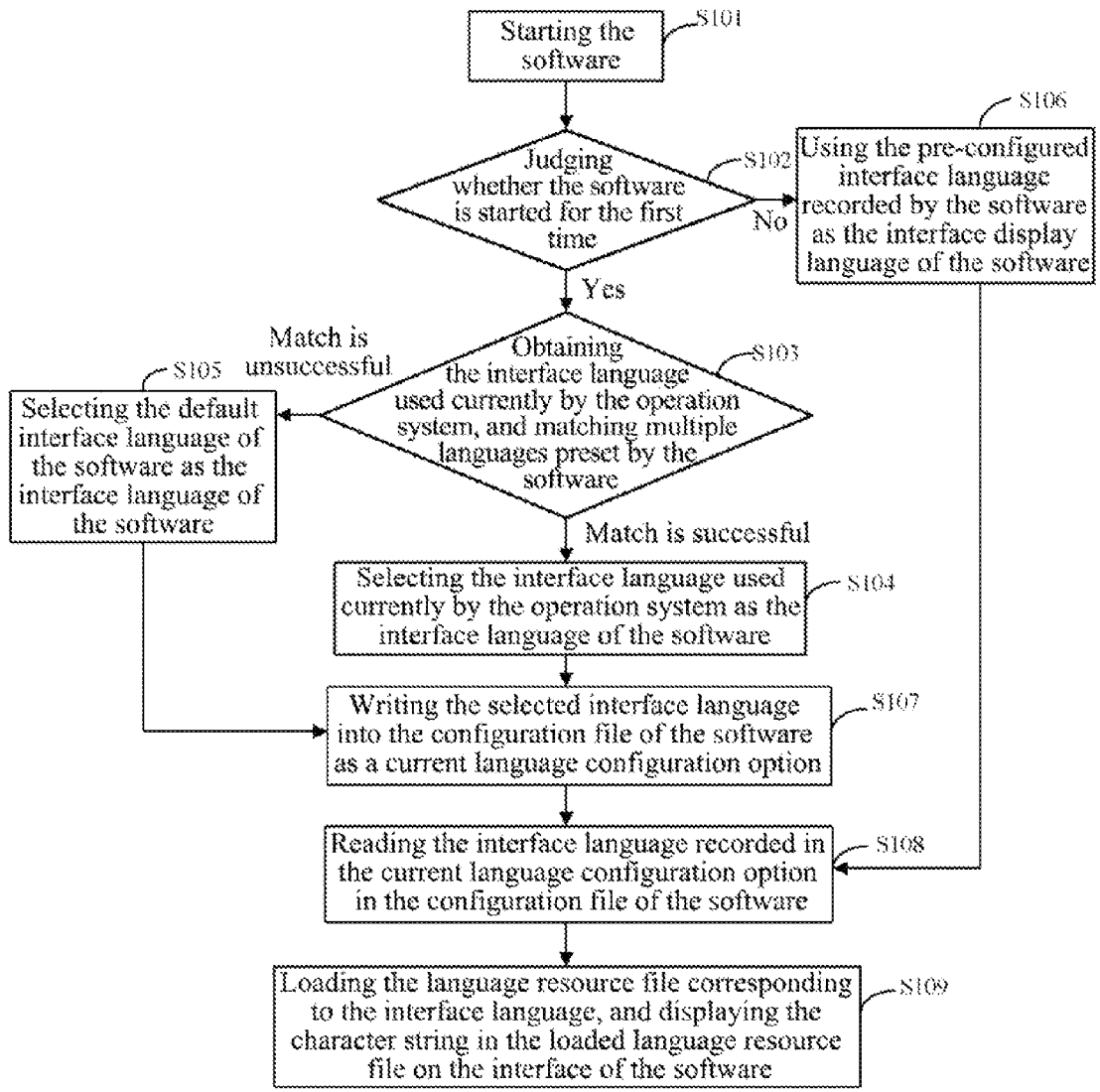
FIG. 1 is a flowchart of a method for selecting an interface language of software provided by an embodiment of the present invention.

The method for selecting an interface language of software provided by an embodiment of the present invention is as shown in FIG. 1, comprising the following steps.

In step S101, the software started;

In step S102, whether the software is started for the first time is judged; if it is, the following step S103 is executed; if it is not, the following step S106 is executed;

In step S103, the interface language used currently by the operation system is obtained to match multiple languages preset by the software, if the match is successful, step S104 is executed; if the match is unsuccessful, the following step S105 is executed;

In step S104, the interface language used currently by the operation system is selected as the interface language of the software, and then S107 is executed;

In step S105, a default interface language of the software is selected as the interface language of the software, and then S107 is executed;

In step S106, the pre-configured interface language recorded by the software is used as the interface display language of the software.

In step S107, the selected interface language is written into the configuration file of the software as a current language configuration option.

Each of the above steps will be described in detail below.

In the above-mentioned S102, whether the software is started for the first time is judged specifically by judging whether a configuration option is used for the first time in the configuration file of the software, and if the configuration option is used in the configuration file of the software for the first time, it suggests that the software is started for the first time, or else, it is judged that it is not the first start of software.

In the above step S103, the multiple languages pre-configured by the software refer to various kinds of interface languages pre-configured and supported by the software, such as English, Chinese, French and so on, and if the interface language used by the operation system used by the current user is Chinese, then the match is successful, and Chinese is taken as the interface language of the software.

In the above step S105, the default interface language of the software may be one of the multiple languages that the software pre-configures and can support, and a language with a higher use frequency may be preferably used as a default interface language according to the use frequency of each kind of language. After the default interface language is selected as the current interface language of the software, it also needs to write the default interface language into the configuration file as a current language configuration option.

In the above step S106, if is the software is not started for the first time, then the configuration file of the software must contain a current language configuration option, and the pre-configured interface language recorded in the configuration file of the software is directly taken as the current interface language of the software.

During the above selection of the interface language, the interface language used by the operation system may be taken as the current interface language of the software, because the interface language used by the operation system is generally determined by the user according to his own language usage habits or requirements. This adaptive selecting method could facilitate use of users, and avoid the trouble of the user pre-selecting an interface language of the software. According to the method, the pre-configured default interface language may also be selected as the current interface language of the software. A language used in a higher frequency may be selected as the default interface language, which can also achieve the object that the user needs not to pre-select the interface language of the software to a certain extent.

In the above step S107, the purpose of writing a selected interface language into the configuration file as a current language configuration option is that, when the software is started next time, a corresponding display may be realized by reading an interface language recorded in the current language configuration option in the configuration file.

After the above steps of selecting the interface language of the software are accomplished, the method for selecting an interface language of software provided by the embodiments of the present invention, as shown in FIG. 1, further comprises the following steps.

In step S108, the interface language recorded in the current language configuration option in the configuration file of the software is read;

In step S109, the language resource file corresponding to the interface language is loaded, and the character string in the loaded language resource file is displayed on the interface of the software.

According to the embodiments of the present invention, the language resource file is pre-edited according to the format shown in the following TABLE 1, and the relevant information of each character string needing to be displayed on the software interface is recorded in each row of the language resource rile.

TABLE 1

| "English description" | = | "other languages" | ; |
| --- | --- | --- | --- |

In the above TABLE 1, "English description" is the Key value of the language used in the application software, while the "other languages" is a value corresponding to the Key value.

"English description" refers to English content corresponding to the character string needing to be displayed on the software interface, for example, in the Chinese language resource file, the value corresponding to the key value of character string "SMS" in the software interface (i.e. the content behind the equal sign) is "short messages".

According to the embodiments of the present invention, the reason that the English content of the character string needing to be displayed on the software interface, rather than other signs, are used as the key value is that English is the language that has the widest applicable range among other current various natural languages. If the translation of other languages corresponding to the character string required for the interface description is omitted during the process of software design, the corresponding English rather than other languages that are not universal may also be displayed on the interface of the software to avoid unfriendly user experience to a certain extent.

For ease of invoking, the language resource file may be encapsulated into a library, the language resources may be transformed into a Dictionary according to the format of the language resource file, and the language resource information may be stored in the form of Key-Value pairs.

The process of loading the language resource file in the above step S109 comprises the following steps, namely:

invoking the language resource file corresponding to the interface language recorded by the current language configuration option;

analyzing each character string corresponding to the description of the software interface and recorded by the language resource file;

displaying the analyzed character string on the interface of the software.

For example, the description such as "Send SMS" of the software interface is analyzed, the Key value with a "Send SMS" in front of an equal sign is queried in the language resource file, and the content of the value corresponding to the Key value such as Chinese character string "send short message" is displayed on the interface of the software.

Figure 2:
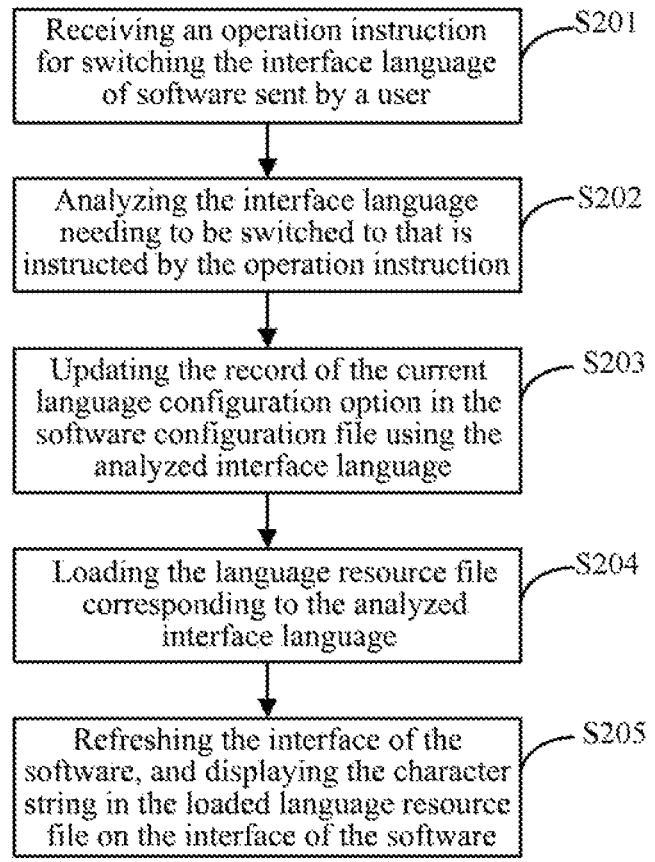
FIG. 2 is a flowchart for realizing switching of the interface language of software provided by an embodiment of the present invention.

According to the method for selecting the interface language of software provided by the embodiments of the present invention, when the user uses the software and needs to switch the interface language of the software, as shown in FIG. 2, the following steps are executed.

In step S201, an operation instruction for switching the interface language of software sent by a user is received;

In step S202, the interface language needing to be switched to that is instructed by the operation instruction is analyzed;

In step S203, the record of the current language configuration option in the software configuration file is updated using the interface language analyzed in the step S203;

In step S204, the language resource file corresponding to the interface language analyzed in the step S203 is loaded;

In step S205, the interface of the software is refreshed, and the character string in the loaded language resource file is displayed on the interface of the software.

In the above S203, what is recorded in the updated current language configuration option is the language to which the user selects to switch, so that the language selected actively by the user can still be used when the software is started next time.

In the above step S204, the character string on the control on the software interface is refreshed to be the character string corresponding to the interface language selected by the current user by directly invoking the language resource file.

Based on the same invention concept, the embodiments of the present invention also provide an apparatus for selecting an interface language of software, and since the principle of the apparatus for solving the problem is similar to that of the above-mentioned method for selecting an interface language of software, reference may be made to the implementation of the method for the implementation of the apparatus, and the repeated content will not be described here.

Figure 3:
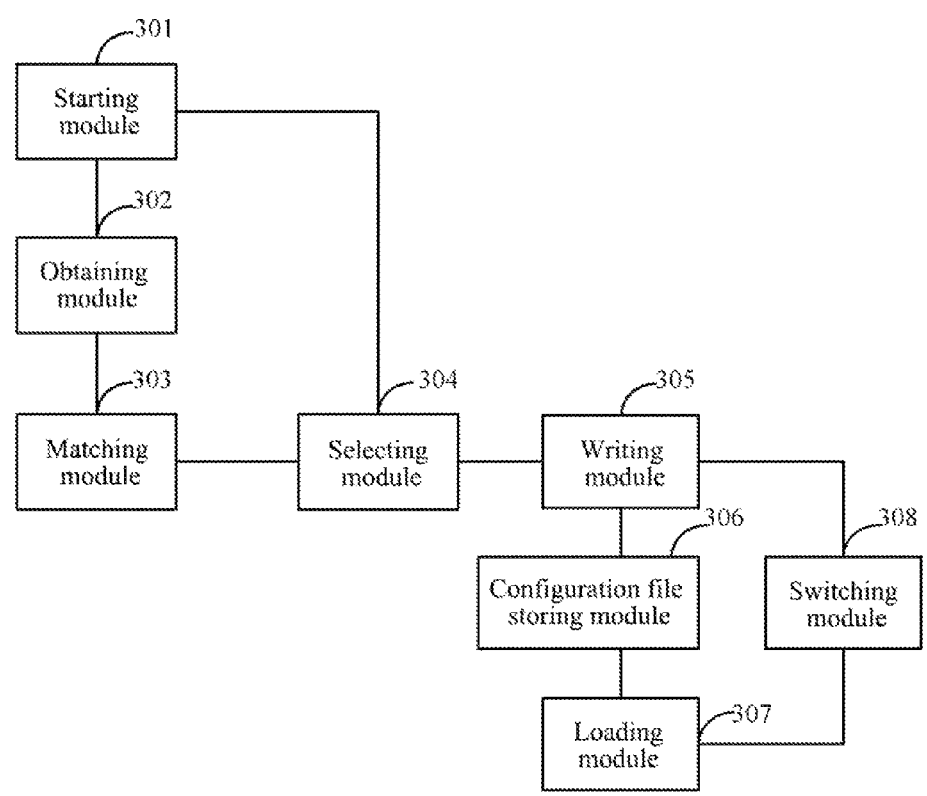
FIG. 3 is a schematic diagram of the structure of an apparatus for selecting an interface language of software provided by an embodiment of the present invention.

An apparatus for selecting an interface language of software provided by an embodiment of the present invention, as shown in FIG. 3, comprises:

a starting module 301, which is configured to start the software and judge whether the software is started for the first time;

an obtaining module 302, which is configured to, when the starting module 301 judges that the software is started for the first time, obtain the interface language used currently by the operation system;

a matching module 303, which is configured to match the interface language used currently by the operation system with multiple languages pre-configured by the software;

a selecting module 304, which is configured to, when the matching module 303 is successful in matching, select the interface language used currently by the operation system as the interface language of the software, and if it is unsuccessful, select a default interface language as the interface language of the software; and when the starting module judges that the software is not started for the first time, use the pre-configured interface language recorded by the software as the interface display language.

The starting module is configured to judge whether the software is started for the first time by judging whether the configuration option in the configuration file of the software is used for the first time.

The apparatus for selecting an interface language of software provided by the embodiment of the present invention further comprises: a writing module 305 and a configuration file storing module 306;

the writing module 305 is configured to write the selected interface language into the configuration file of the software as a current language configuration option;

the configuration file storing module 306 is configured to store the configuration file of the software.

The apparatus for selecting an interface language of software provided by the embodiment of the present invention further comprises: a loading module 307, which is configured to read the interface language recorded by the current language configuration option in the configuration file of the software, load the language resource file corresponding to the interface language, and display the character string in the loaded language resource file on the interface of the software.

Figure 4:
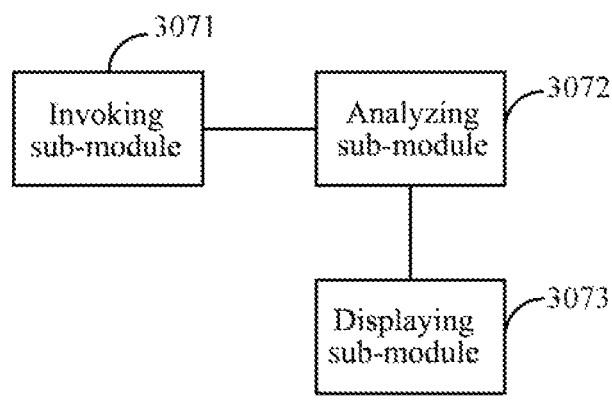
FIG. 4 is a schematic diagram of the structure of a loading module in an apparatus for selecting an interface language of software provided by an embodiment of the present invention.

The above-mentioned loading module 307, as shown in FIG. 4, comprises:

an invoking sub-module 3071, which is configured to invoke the language resource file corresponding to the interface language recorded by the current language configuration option;

a parsing sub-module 3072, which is configured to analyze each character string corresponding to the description of the software interface and recorded by the language resource file;

a displaying sub-module 3073, which is configured to display the analyzed character string on the interface of the software.

The apparatus for selecting an interface language of software provided by the embodiment of the present invention further comprises: a switching module 308, which is configured to receive an operation instruction for switching the interface language of software sent by the user and analyze the interface language needing to be switched to that is instructed by the operation instruction;

the writing module 305 is further configured to update the record of the current language configuration option in the software configuration file using the interface language analyzed by the switching module;

the loading module 307 is further configured to load a language resource file corresponding to the analyzed interface language, refresh the interface of the software, and display the character string in the language resource file on the interface of the software.

According to the method and apparatus for selecting an interface language of software provided by the embodiments of the present invention, the software is started and judged whether it is started for the first time; if it is, the interface language currently used by an operation system is obtained to match a plurality of languages preset by the software, if the match is successful, the interface language used currently by the operation system is selected as the interface language of the software, and if the match is unsuccessful, the default interface language of the software is selected as the interface language of the software. Because the interface language used by the operation system is generally determined by the user according to his own language usage habits or requirements, this adaptive selecting method could avoid the trouble of the user pre-selecting an interface language of the software under the premise of satisfying the usage habits and usage requirements of the user, facilities use of users and improves the experience of users.

Furthermore, according to the method and apparatus for selecting an interface language of software provided by the embodiments of the present invention, when the user needs to switch the interface language of the software, the interface language needing to be switched to instructed by a user switching operation instruction is analyzed; the language resource file corresponding to the analyzed interface language is loaded; the interface of the software is refreshed, and the character string in the loaded language resource file is displayed on the interface of the software. The switching of the interface language may be validated without re-starting the software, so the user switches the interface language more conveniently and quickly.

Obviously, those skilled in the art may make various changes and variations without departing from the spirit and scope of the present invention. Thus, if these changes and variations of the present invention belong to the scope of the claims of the present invention and the equivalent technology, the present invention intends to include these changes and variations.

INDUSTRIAL APPLICABILITY

Compared with the existing technology, the method and apparatus according to the present invention avoids the trouble of the user pre-selecting an interface language of the software under the premise of satisfying the usage habits and usage requirements of the user, facilities use of users and improves the experience of users. The switching of the interface language may be validated without re-starting the software, so the user switches the interface language more conveniently and quickly.

What is claimed is:

1. A method for selecting an interface language of software, comprising:

starting software and judging whether the software is started for the first time;

if yes, obtaining the interface language used currently by an operation system to match multiple languages pre-configured for the software, if the match is successful, selecting the interface language used currently by the operation system as the interface language of the software, if the match is unsuccessful, selecting a default interface language of the software as the interface language of the software;

if the software is not started for the first time, using a pre-configured interface language recorded by the software as the interface language of the software;

writing the selected interface language into the configuration file of the software as a current language configuration option; wherein, the pre-configured interface language recorded by the software is the interface language already recorded by the current language configuration option of the configuration file of the software.

2. The method according to claim 1, wherein, in the step of judging whether the software is started for the first time, judgment is made according to whether a configuration option is used in a configuration file of the software for the first time.

3. The method according to claim 2, wherein, after the step of writing the selected interface language into the configuration file as a current language configuration option, or after the step of using the interface language that has been recorded by the current configuration option of the configuration file of the software as the interface language of the software, the method further comprises:

reading the interface language recorded by the current language configuration option in the configuration file of the software, loading a language resource file corresponding to the read interface language, and displaying a character string in the loaded language resource file on an interface of the software.

4. The method according to claim 3, wherein, the step of loading the language resource file corresponding to the read interface language and displaying the character string in the loaded language resource file on the interface of the software comprises:

invoking the language resource file corresponding to the interface language recorded by the current language configuration option;

analyzing out each character string corresponding to a description of the software interface and recorded by the language resource file; and displaying the analyzed character string on the interface of the software.

5. The method according to claim 4, further comprising: when an operation instruction for switching the interface language of the software sent by a user is received, analyzing the interface language needing to be switched to that is instructed by the operation instruction;

updating a record of the current language configuration option in the configuration file of the software by using the analyzed interface language;

loading the language resource file corresponding to the analyzed interface language;

refreshing the interface of the software, and displaying the character string in the loaded language resource file on the interface of the software.

6. The method according to claim 3, further comprising: when an operation instruction for switching the interface language of the software sent by a user is received, analyzing the interface language needing to be switched to that is instructed by the operation instruction;

updating a record of the current language configuration option in the configuration file of the software by using the analyzed interface language;

loading the language resource file corresponding to the analyzed interface language;

refreshing the interface of the software, and displaying the character string in the loaded language resource file on the interface of the software.

7. The method according to claim 2, further comprising: when an operation instruction for switching the interface language of the software sent by a user is received, analyzing the interface language needing to be switched to that is instructed by the operation instruction;

updating a record of the current language configuration option in the configuration file of the software by using the analyzed interface language;

loading the language resource file corresponding to the analyzed interface language;

refreshing the interface of the software, and displaying the character string in the loaded language resource file on the interface of the software.

8. The method according to claim 2, further comprising: when an operation instruction for switching the interface language of the software sent by a user is received, analyzing the interface language needing to be switched to that is instructed by the operation instruction;

updating a record of the current language configuration option in the configuration file of the software by using the analyzed interface language;

loading the language resource file corresponding to the analyzed interface language;

refreshing the interface of the software, and displaying the character string in the loaded language resource file on the interface of the software.

9. The method according to claim 1, further comprising: when an operation instruction for switching the interface language of the software sent by a user is received, analyzing the interface language needing to be switched to that is instructed by the operation instruction;

updating a record of the current language configuration option in the configuration file of the software by using the analyzed interface language;

loading the language resource file corresponding to the analyzed interface language;

refreshing the interface of the software, and displaying the character string in the loaded language resource file on the interface of the software.

10. An apparatus for selecting an interface language of software, comprising:

a starting module, which is configured to start the software and judge whether the software is started for the first time;

an obtaining module, which is configured to: when the starting module judges that the software is started for the first time, obtain an interface language used currently by an operation system;

a matching module, which is configured to match the interface language used currently by the operation system to multiple languages pre-configured for the software;

a selecting module, which is configured to: when the matching module matches successfully, select the interface language used currently by the operation system as the interface language of the software, and if the match is unsuccessful, select a default interface language of the software as the interface language of the software; and when the starting module judges that the software is not started for the first time, use a pre-configured interface language recorded by the software as an interface display language of the software;

a writing module is configured to write the interface language selected by the selecting module into the configuration file of the software as a current language configuration option;

a configuration file storing module is configured to store the configuration file of the software.

11. The apparatus according to claim 10, wherein, the starting module is configured to judge whether the software is started for the first time according to whether a configuration option in a configuration file of the software is used for the first time.

12. The apparatus according to claim 10, further comprising: a loading module, which is configured to read the interface language recorded by the current language configuration option in the configuration file of the software, load a language resource file corresponding to the read interface language, and display a character string in the loaded language resource file on an interface of the software.

13. The apparatus according to claim 12, wherein, the loading module comprises:

an invoking sub-module, which is configured to invoke the language resource file corresponding to the interface language recorded by the current language configuration option;

an analyzing sub-module, which is configured to analyze each character string corresponding to a description of the interface of the software and recorded by the language resource file;

a displaying sub-module, which is configured to display the character string analyzed by the analyzing sub-module on the interface of the software.

14. The apparatus according to claim 10, further comprising: a switching module, which is configured to, when receiving an operation instruction for switching the interface language of the software sent by a user, analyze the interface language needing to be switched to that is instructed by the operation instruction;

the writing module is further configured to update a record of the current language configuration option in the software configuration file by using the interface language analyzed by the switching module;

the loading module is further configured to load a language resource file corresponding to the interface language analyzed by the switching module, refresh the interface of the software, and display the character string in the loaded language resource file on the interface of the software.

* * * * *